United States Patent [19]

Spring

[11] Patent Number: 5,230,035
[45] Date of Patent: Jul. 20, 1993

[54] MOTOR SPEED CONTROLLER

[76] Inventor: Gregson W. M. Spring, 7 Great Calcroft, Pershore, Worcestershire, United Kingdom, WR10 1SQ

[21] Appl. No.: 837,119

[22] Filed: Feb. 19, 1992

[30] Foreign Application Priority Data

Mar. 6, 1991 [GB] United Kingdom ............. 9104686

[51] Int. Cl.$^5$ ............................................. H02P 5/168
[52] U.S. Cl. ................................... 388/815; 388/811; 388/910
[58] Field of Search ............................ 388/809-815, 388/816-823, 910, 906; 318/600-601, 599, 615-617, 687, 799, 811

[56] References Cited

U.S. PATENT DOCUMENTS

| | | | |
|---|---|---|---|
| 4,525,658 | 6/1985 | Yanagida | 388/815 X |
| 4,763,054 | 8/1988 | Bundy | 388/847 X |
| 4,851,744 | 7/1989 | Kotzur et al. | 388/815 |
| 5,010,582 | 4/1991 | Kawamura | 388/910 X |
| 5,086,492 | 2/1992 | Kent | 388/815 |
| 5,123,081 | 6/1992 | Bachman et al. | 388/910 X |

Primary Examiner—William M. Shoop, Jr.
Assistant Examiner—David Martin
Attorney, Agent, or Firm—Ira S. Dorman

[57] ABSTRACT

A motor speed controller, for example for accurate linear control of DC motors, includes an error amplifier, such as an integrating error amplifier, for providing a variable controlled voltage to a motor in response to an input to the amplifier, the input comprising a combination of a demand signal representative of a desired speed of the motor and a feedback signal representative of an actual speed of the motor. An electronic switch, such as a transconductance amplifier, has a first input responsive to an electrical signal representative of the actual speed of the motor and a second input responsive to the polarity of the output of the amplifier so as to provide the feedback signal, the value of the feedback signal being dependent on the value of the signal representative of the actual speed of the motor and the polarity of the signal being dependent on the polarity of the output of the amplifier.

11 Claims, 5 Drawing Sheets

MOTOR SPEED CONTROLLER

The present invention relates to a motor speed controller and may be used, for example, for accurate linear control of DC motors.

DESCRIPTION OF PRIOR ART

Known motor speed controllers tend to be based on digital circuits in which bursts of power from the controller are smoothed by the inertia of the motor. While such digital speed controllers are acceptable in many situations, there is a need for a more accurate, linear speed controller in situations for example where any torque ripples are unacceptable, such as in tape and video recorders and/or players.

OBJECT OF THE INVENTION

It is an object of the present invention to provide a motor speed controller which is able to provide accurate linear control of a DC motor.

SUMMARY OF THE INVENTION

According to the present invention there is provided a motor speed controller which comprises:
- an error amplifier for providing a variable controlled voltage to a motor in response to an input to the amplifier, the input comprising a combination of a demand signal representative of a desired speed of the motor and a feedback signal representative of an actual speed of the motor; and
- an electronic switch having a first input responsive to an electrical signal representative of the actual speed of the motor and a second input responsive to the polarity of the output of the amplifier so as to provide the feedback signal, the value of the feedback signal being dependent on the value of the signal representative of the actual speed of the motor and the polarity of the signal being dependent on the polarity of the output of the amplifier.

The amplifier may comprise an integrating error amplifier.

The electronic switch may comprise a transconductance amplifier. The transconductance amplifier may be designed to operate substantially in its non-linear region.

The motor speed controller may include a frequency to current converter for converting a stream of digital pulses output from a sensor attached to the motor into a signal in the form of a current representative of the actual speed of the motor. The frequency to current converter may include a monostable.

The monostable may be connected between zero volts and a negative voltage. The converter may incorporate two inputs, one input being adapted for positive referenced sensors and the other input being adapted for negative referenced sensors.

Alternatively, the monostable may be connected between zero volts and a positive voltage and may be provided with a current translation circuit.

The controller may include means for providing a feedback signal which is dependent upon the current passing through the motor.

For a better understanding of the present invention and to show more clearly how it may be carried into effect reference will now be made, by way of example, to the accompanying drawings in which:

DESCRIPTION OF PREFERRED EMBODIMENTS

Figure 1:
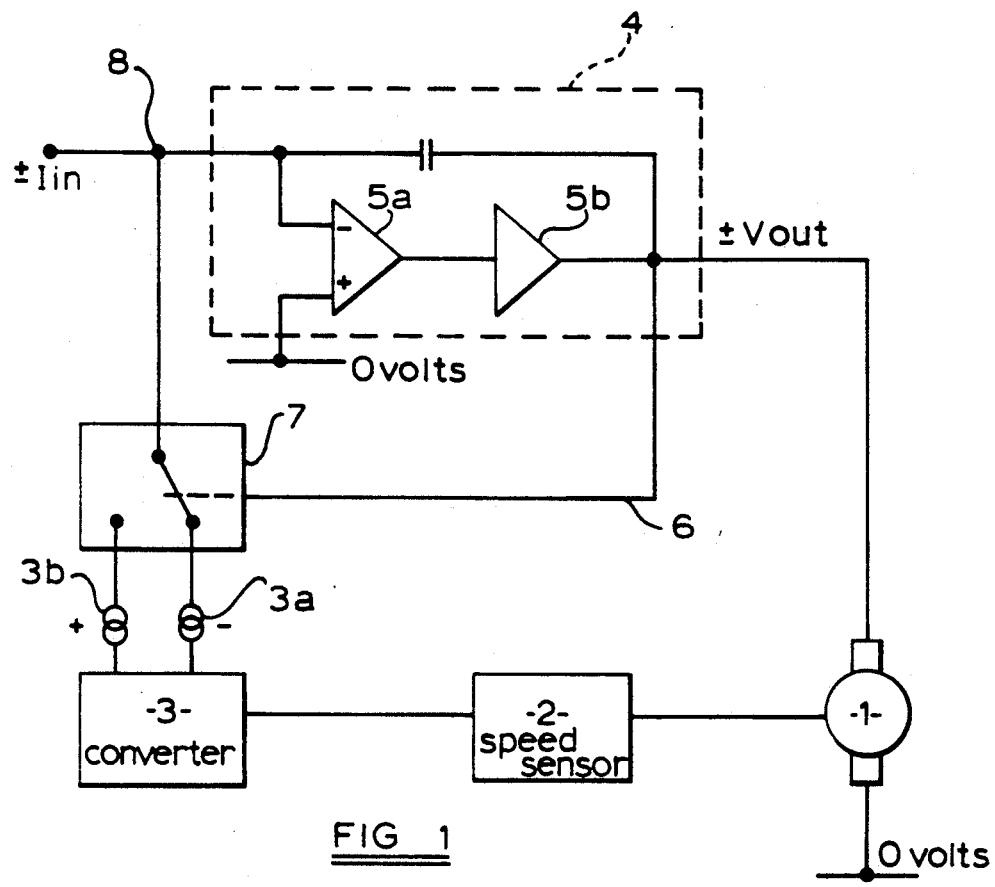
FIG. 1 is a block diagram which shows a motor in association with a diagrammatic representation of a motor speed controller according to the present invention.

The block diagram shown in FIG. 1 represents a DC motor 1 which is provided with a motor speed controller. The precise characteristics of the motor 1 are not important since, once the nature of the present invention is understood, any modifications that may be necessary to the motor speed controller to adapt the same to any particular motor are straightforward and do not require any inventive ability. The motor 1 incorporates a speed sensor 2 which may be of any conventional construction. The speed sensor may be any suitable sensor which produces a digital output stream such as an optical, inductive or a magnetic sensor. The output from the digital speed sensor 2 shown in FIG. 1 is dependent on the rotational speed of the motor shaft and is converted to a corresponding electrical signal in the form of a current in a frequency to current converter 3.

The motor speed controller includes an integrating error amplifier generally designated 4, the error amplifier incorporating an operational amplifier 5a and a power amplifier 5b, a feedback loop 6 and a polarity sensitive electronic switch 7 to route feedback current in the desired direction with respect to a summing junction 8. The input demand can be of either polarity to create bi-directional rotation of the motor.

The motor speed controller operates in the following manner. Initially, a positive input current $I_{in}$, representing a desired motor speed, is applied at the summing junction 8 and results in a negative output voltage $V_{out}$ from the amplifier 4. The motor 1 then begins to accelerate resulting in an output from the sensor 2 such as a stream of digital pulses whose frequency is proportional to the instantaneous (actual) motor speed. The frequency to current converter 3 provides a feedback current which is proportional to the actual motor speed. The feedback loop 6 from the output of the amplifier 4 acts on the electronic switch 7 to route feedback current in the desired direction with respect to the summing junction 8 at the input of the integrating error amplifier 5a to give loop stability. Initially, for a positive input current $I_{in}$ a negative feedback current 3a is routed to the summing junction 8, that is to say feedback current 3a is routed out from the summing junction 8. In response to the modified input current, the output of the error amplifier 4 is then adjusted automatically. Therefore, the output of the amplifier 4 is proportional to the integral of the difference between the input and feedback currents.

Should the input current $I_{in}$ ever become negative the operation of the loop remains essentially the same except that the polarity of the output voltage $V_{out}$ of the amplifier 4 and the output of the electronic switch 7 swap over to route a positive feedback current 3b to the summing junction 8.

Figure 2:
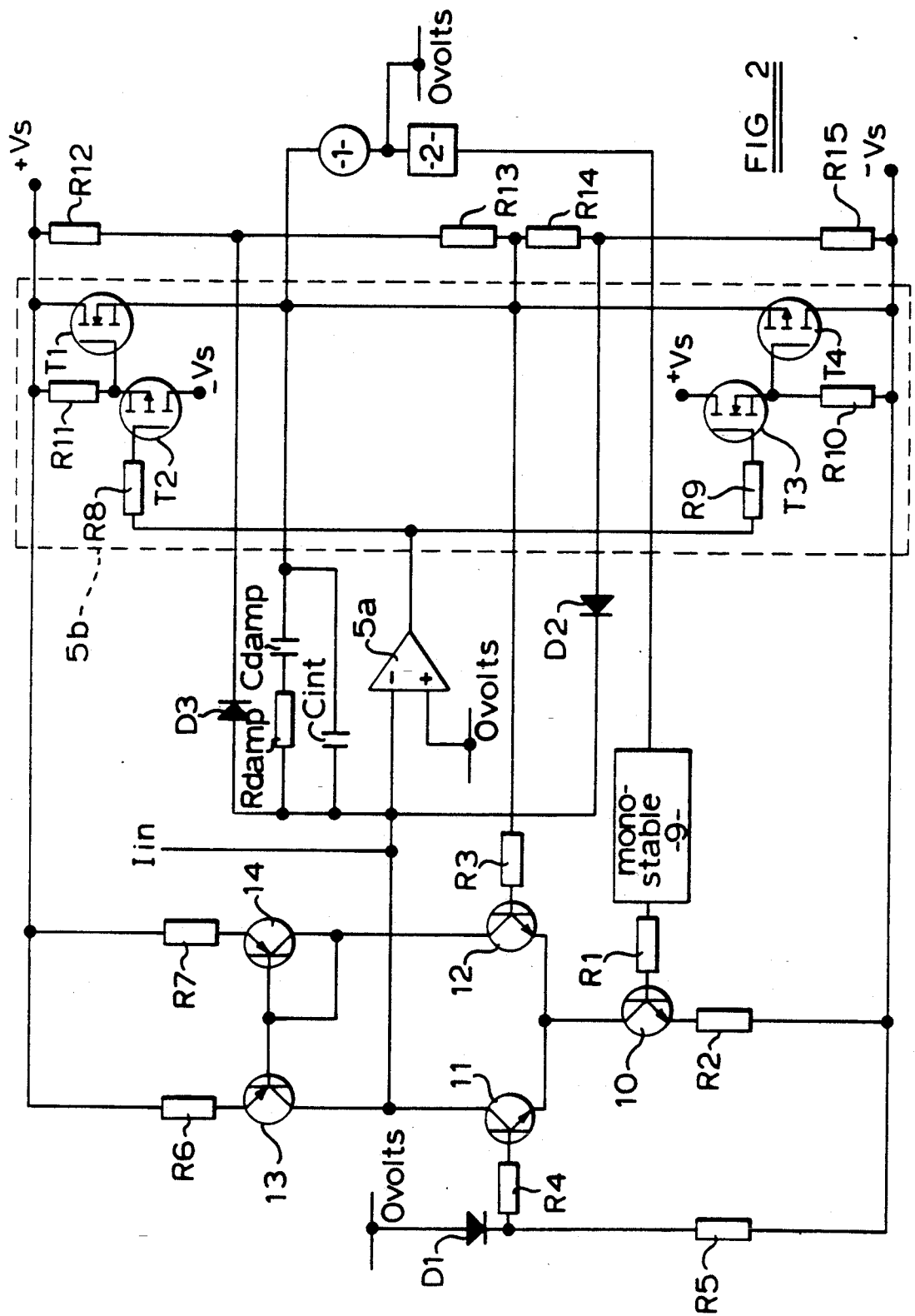
FIG. 2 is a circuit diagram showing a motor in association with a detailed representation of the circuit of one embodiment of a motor speed controller according to the present invention.

The circuit diagram shown in FIG. 2 is in accordance with the block diagram of FIG. 1 and the same reference numbers are used to denote the same or similar components. The circuit diagram shown in FIG. 2 includes a motor 1 which may be the same motor as that shown in FIG. 1. The speed sensor 2 may also be the same as that used in accordance with FIG. 1. The frequency to current converter effectively comprises a monostable 9 and a transistor 10. The monostable 9 derives rate information from the stream of digital pulses from the sensor 2, the pulse width of the monostable being arranged to be a fraction of the fastest frequency experienced from the sensor. Thus, for each double or half speed change, the relative speed information doubles or halves respectively. The output from the monostable is fed to transistor 10 which is switched on and off in accordance with the output so as to pass a stream of current pulses whose average value is proportional to the speed of rotation of the motor 1.

Transistors 11, 12, 13 and 14 form a transconductance amplifier which effectively comprises the electronic switch and provides the feedback current in response to a current from transistor 10. Transconductance amplifiers are usually used in their linear region as amplifiers, but in the present application the transconductance amplifier is used substantially in its non-linear region to switch feedback current in the required direction with respect to the summing junction 8, the feedback current being dependent on the current derived from the monostable 9 and transistor 10. Since the output of a transconductance amplifier is a current, it readily couples directly to the summing junction 8 of the integrating error amplifier 4. For its part, the error amplifier 4 presents a low impedance to the transconductance amplifier to achieve optimum matching between components and to maximise sensitivity.

By controlling one of the differential transistors 12 within the transconductance amplifier by way of the feedback loop 6, the output of the amplifier 4 is able to control automatically the direction of the feedback current. For example, for a positive input current $I_{in}$, the output voltage $V_{out}$ tends towards a negative source voltage $-V_s$. This switches off the controlled transistor 12, forcing the feedback current to flow from the summing junction 8 through transistors 11 and 10 down to the negative source voltage $-V_s$. On the other hand, for a negative input current $I_{in}$, the output voltage $V_{out}$ tends towards a positive source voltage $+V_s$. This allows the controlled transistor 12 to conduct, forcing transistor 11 to switch off. Feedback current flows through transistors 14, 12 and 10 down to the negative voltage source $-V_s$. The feedback loop is closed because the transistors 13 and 14 constitute a current mirror. Thus any current that flows through transistor 14 also flows through transistor 13. However, because transistor 11 is switched off, the current sourced from transistor 13 flows into the summing junction 8 and closes the loop.

The error amplifier 4 includes an integrating capacitor $C_{int}$ and compares the input or demand current $I_{in}$ and the current from the frequency to current converter as represented by the feedback current flowing into or out of the summing junction 8. The difference current is integrated and an output voltage proportional to this integral difference is presented to the power amplifier 5b. The error amplifier also provides an additional "dynamic" path which allows the speed loop to be stabilised if necessary.

The power amplifier 5b is shown merely by way of illustration. Although a power amplifier of some kind is required, the precise form is not important. The power amplifier serves as a convenient power stage for interfacing the low power available from the operational amplifier 5a with the high power levels required by the motor 1. Resistors R12, R13, R14 and R15, together with diodes D2 and D3 allow the power amplifier 5b to limit the total voltage to the motor 1 and act as a bipolar safety feature. For either polarity the circuit works by strapping one side of a potential divider, for example R12 and R13, to the supply and the other side to the output of the amplifier. For linear conditions the diode D2 or D3 remains reversed biased and therefore inactive. However, if the amplifier output exceeds the preset limit, the diodes conduct providing an alternative feedback path to change the closed loop gain and hence limit the motor voltage. Determining the preset voltage is a straightforward task for the skilled person. For example, if the supply rails are at ±15 volts and the output is limited to ±12 volts, the limiting resistors are conveniently 1000 ohms for R13 and R14 and 1200 ohms for R12 and R15. Further details of the power amplifier and other components are given hereinafter.

Speed controllers by their nature must operate over a wide range of speed demand. If the various components are incorporated into an integrated circuit, it is possible for the manufacturer to determine the parameters of the transistors so as to allow a high degree of linearity without the need for additional external components. However, if discrete components are used, it is necessary to incorporate linearising resistors in the emitter circuits of at least some of the transistors. The linearising resistors extend the linear range of the transistors from 1 decade to 3 decades or more. There is no need to describe the operation of the linearising resistors in greater detail, but additional information on those components not described in detail is given hereinafter.

The steady state stability and transient performance of the motor speed loop is linked to the characteristics of the components within the loop. Additional rotational inertia applied to the motor shaft will affect the loop performance and may in extreme situations introduce complete instability. $R_{damp}$ and $C_{damp}$ are provided to allow the circuit to be stabilised for any motor load. Suitable values for $R_{damp}$ and $C_{damp}$ can be derived by analysing the loop frequency response using one of the standard techniques well known to the skilled person.

When used in association with a motor manufactured by Escap Motors and available under No. ESCAP 34 12R 11 216E2 and a speed sensor available from RS Components under No. 304-560, the components shown in FIG. 2 may conveniently be as follows:

| | |
|---|---|
| R1, R2, R6-R9, R13 and R14 | 1000 ohms |
| R3-R5 | 100k ohms |
| R10-R11 | 680 ohms |

| -continued | |
|---|---|
| R12 and R15 | 1200 ohms |
| R$_{damp}$ | 22k ohms |
| C$_{damp}$ | 10 μF |
| C$_{int}$ | 1 μF |
| 5a | ADOP07C |
| D1-D3 | 1N4148 |
| 9 | MC14538 |
| 10-14 | HARRIS CA3096 |
| T1 | IRF520 |
| T2 | VP0300M |
| T3 | VN0300M |
| T4 | IRF9520 |

Figure 3:
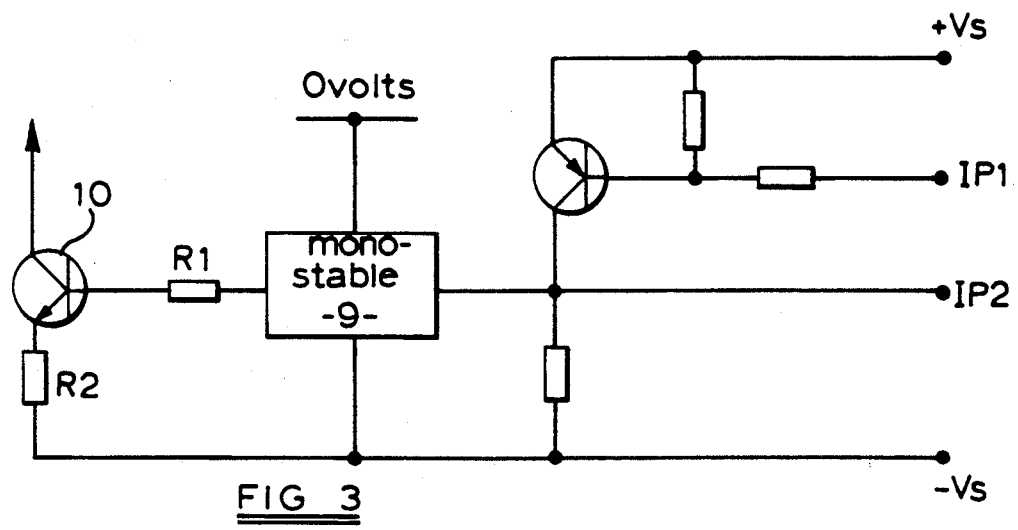
FIG. 3 is a diagram of a first modification of the circuit shown in FIG. 2.

It will be noted that the monostable 9 in FIG. 2 is connected between zero volts and $-V_s$. This arrangement permits the particularly simple frequency to current conversion described with reference to FIG. 2, but for the monostable 9 to operate the digital input stream from the sensor must also move between zero volts and $-V_s$. This may be inconvenient in practice and FIG. 3 illustrates how level translation may be incorporated into the embodiment of FIG. 2 to allow for two separate inputs, IP1 for positive referenced sensors and IP2 for negative referenced sensors. Values for the components shown in FIG. 3 can readily be determined by the skilled person.

Figure 4:
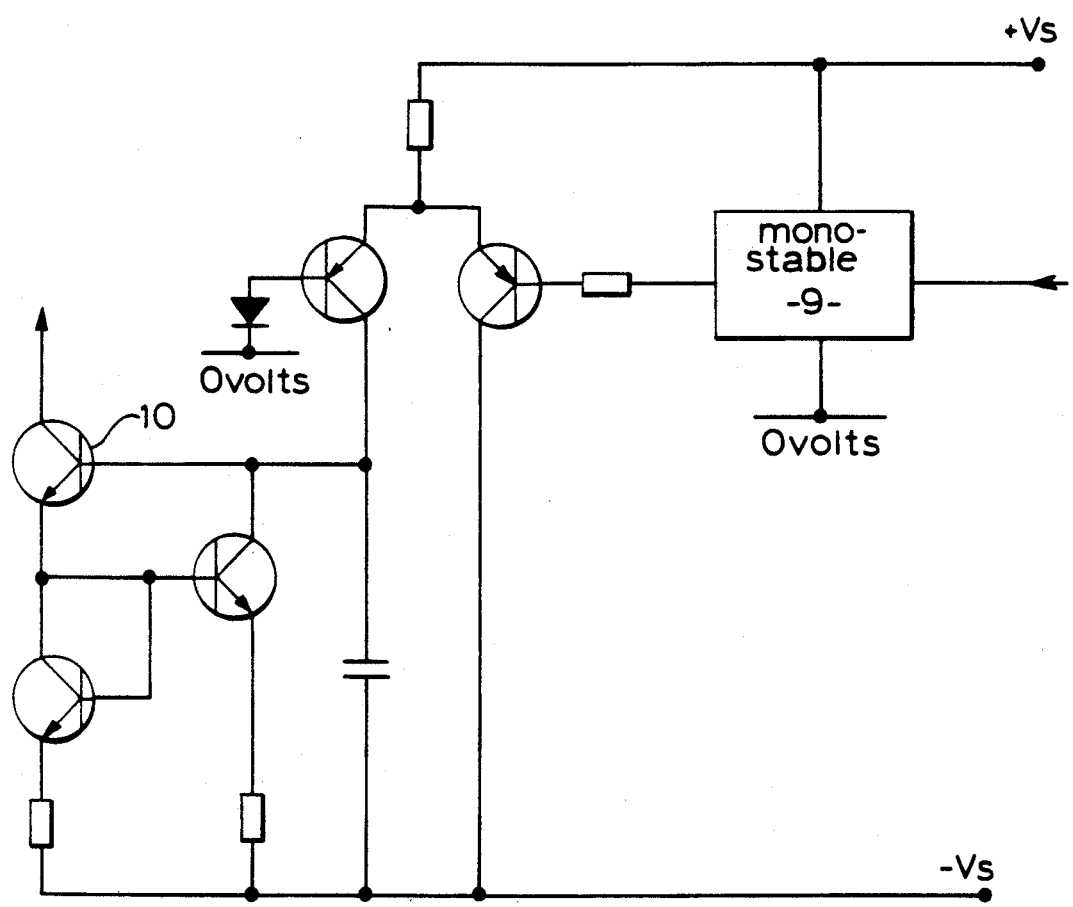
FIG. 4 is a diagram of a second modification of the circuit shown in FIG. 2.

As an alternative to the level translation shown in FIG. 3, the modification shown in FIG. 4 incorporates a current mirror in the form of a Wilson mirror arrangement to provide a current proportional to or otherwise representative of the speed of the motor directly from a positive referenced sensor. Current input from the monostable 9 to the Wilson mirror arrangement is by way of an electronic toggle switch arrangement. Values for the components shown in FIG. 4 can readily be determined by the skilled person.

Figure 5:
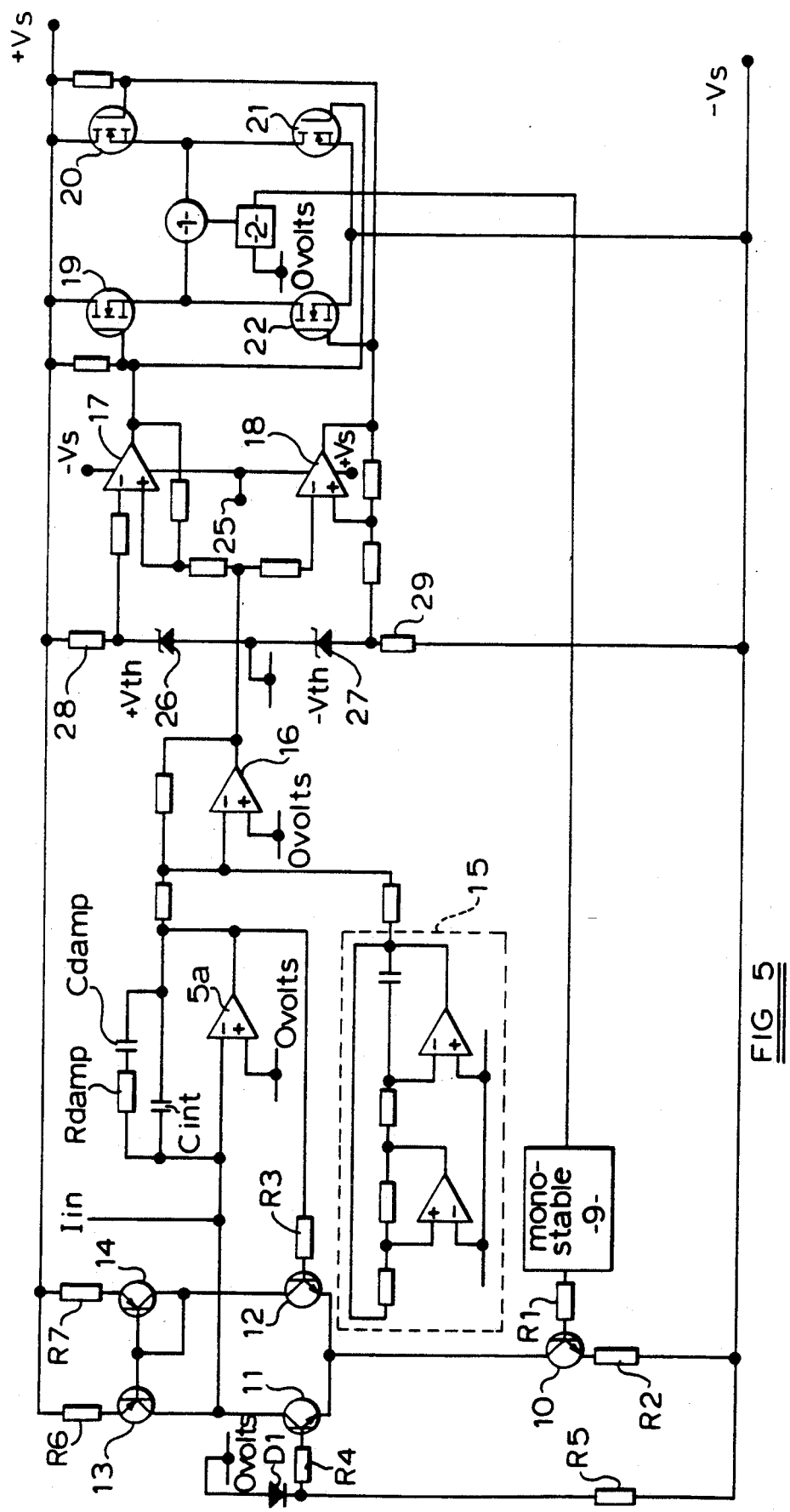
FIG. 5 is a circuit diagram showing a motor in association with a detailed representation of a further embodiment of a motor speed controller according to the present invention.

The circuit diagram shown in FIG. 5 represents a modification of the circuit diagram of FIG. 2 to enable the use of pulse width modulation in the control of the speed of the motor. The circuit diagram of FIG. 5 is in accordance with the block diagram of FIG. 1 and the same reference numbers are used to denote the same or similar components. Pulse width modulation is important because it is a more energy efficient method of motor speed control compared with the circuit diagram of FIG. 2, but may produce more torque ripples.

A local oscillator 15 is used to generate a triangular waveform and this is mixed with the DC output from the integrating error amplifier 5a using a summing amplifier 16. The summing amplifier 16 drives two comparators 17 and 18. Comparator 17 is arranged to respond to positive inputs and hence causes the motor 1 to rotate in one direction, while comparator 18 is arranged to respond to negative inputs and causes to motor 1 to rotate in the opposite direction. Motor control can be implemented using a standard power bridge scheme readily available to the skilled person.

The pulse width modulation operates as follows. When the output from the integrating error amplifier 5a, which is a DC level, is mixed with the triangular output from the local oscillator 15, it causes the triangular wave to move either side of zero volts. If it moves up, nothing happens until the output reaches a trip point at $+V_{TH}$. This allows a measure of deadband to be built into the circuit. When $+V_{TH}$ is exceeded comparator 17 switches and by virtue of transistors 19 and 21 of the power bridge causes the motor to start rotating in one direction. How much power is delivered to the motor 1 depends upon how far the triangular waveform is forced to cross the $+V_{TH}$ threshold. Power delivered to the motor 1 is proportional to the area of each digital packet produced by the comparator 17. While comparator 17 is working, comparator 18 is switched off.

As the triangular output falls from a value above $+V_{TH}$ the speed of the motor 1 will fall until the output is wholly in the deadband region and the motor comes to a stop.

If the triangular wave moves down from the deadband region, nothing will happen until the output reaches a trip point at $-V_{TH}$. When $-V_{TH}$ is exceeded comparator 18 switches and by virtue of transistors 20 and 22 of the power bridge causes the motor to start rotating in the opposite direction. How much power is delivered to the motor 1 again depends upon how far the triangular waveform is forced to cross the $-V_{TH}$ threshold. While comparator 18 is working, comparator 17 is switched off.

The entire bridge can be switched on and off by a master enable 25 to the comparators 17 and 18.

The threshold voltages $+V_{TH}$ and $-V_{TH}$ are generated by two zener diodes 26 and 27 which are referenced to zero volts and give, in conjunction with resistors 28 and 29, two identical reference voltage levels with opposite polarity.

The remaining components of the circuit shown in FIG. 5 are essentially the same as those shown in FIG. 2. Optionally, in order to ensure the motor is not overstressed or to limit motor torque, a small monitoring resistance (not shown) can be placed in series with the motor 1. The voltage developed across the monitoring resistance can be used to limit the motor current by switching off the comparators 17 and 18 driving the bridge.

Figure 6:
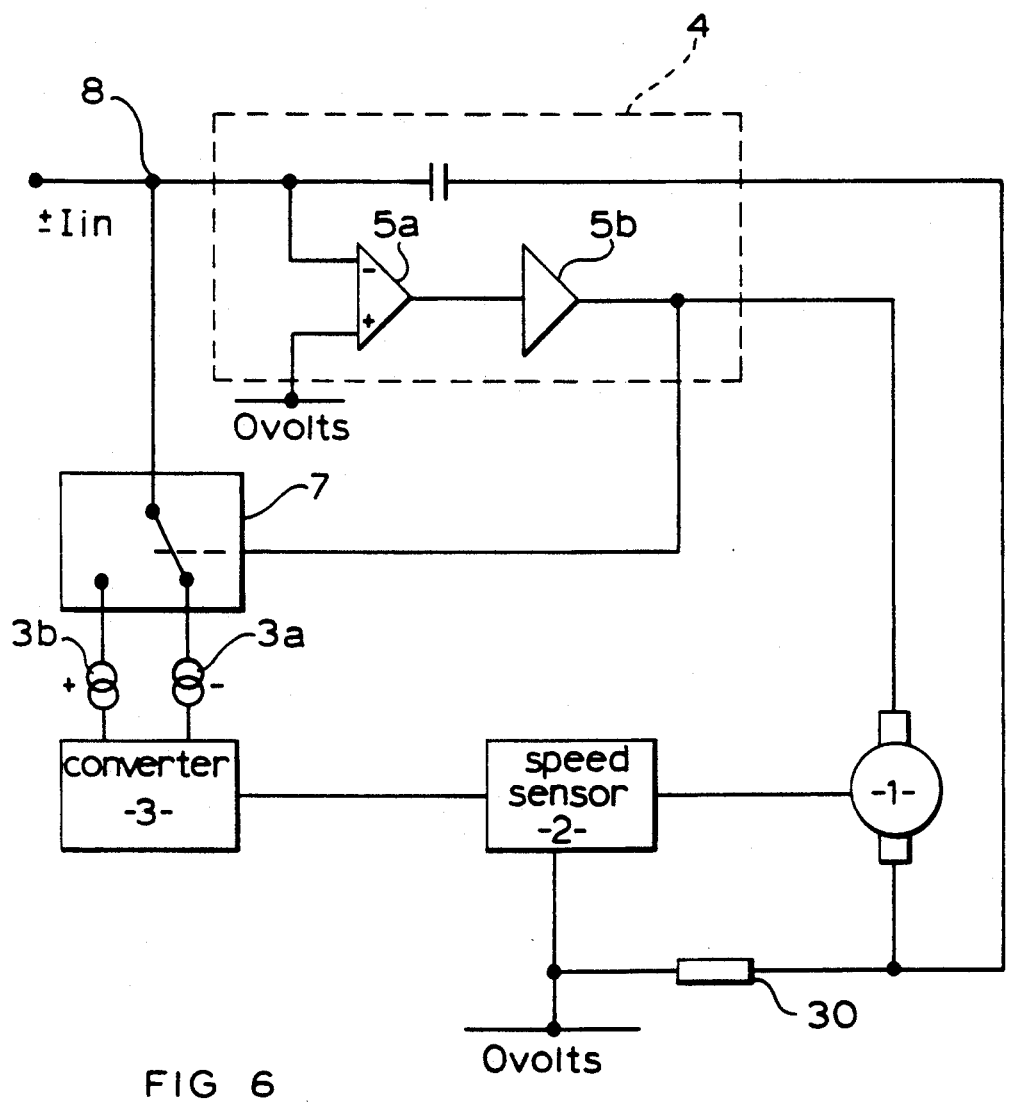
FIG. 6 is a block diagram which shows a motor in association with a diagrammatic representation of another embodiment of a motor speed controller according to the present invention.

The block diagram shown in FIG. 6 is similar to that shown in FIG. 1 and the same references are used to denote the same or similar components. Under normal circumstances, a DC motor when subjected to a rotational resistance will draw more current from the supply in order to maintain a given speed. By drawing more current, the mechanical power developed by the motor also increases. In some applications this increase in power is advantageous, but in others, such as medical applications, it can give rise to concern over safety. Nevertheless, mechanical torque available at the motor shaft can be limited by monitoring and controlling the motor current. Resistor 30 shown in FIG. 6 is used to provide the necessary control.

As with FIG. 1, if a positive demand current $I_{in}$ is applied at the summing junction this results in a negative output from the amplifier 4. Current passes through the motor and a negative voltage is developed across resistor 30. As soon as the motor 1 rotates, a feedback current proportional to speed is generated to draw off a part of the demand current from the summing junction 8 and to bring about a stable speed. Similarly with FIG. 1, the situation is reversed for a negative demand current.

However, if a load disturbance causes a greater current to be drawn by the motor, a larger feedback voltage is developed across resistor 30 and is passed back to the summing junction 8 by way of the capacitor $C_{int}$. Due to the inverting nature of the amplifier 4, a positive change in the feedback voltage causes the motor voltage, and thus the motor current, to be reduced and inhibits the natural tendency of the motor to draw more current. This forces the motor to slow down and the circuit can be seen to operate in a fail safe mode allowing the motor to developed no more power than it was programmed to do by the demand current $I_{in}$.

It will be noted that throughout this description reference has been made to an input or demand current $I_{in}$. However, a voltage demand can readily be achieved in a manner well known to the skilled person by means of a single resistor. Input or demand current and input or demand voltage are therefore interchangeable.

It is notable that most known motor speed controllers employ two sensors to determine the direction and speed of rotation of the motor, the two sensors providing two outputs with a phase difference of 90 degrees. Such quadrature sensors are precision components and are therefore expensive to produce. In contrast to this, the motor speed controller according to the present invention is able to provide bi-directional speed control with only a low cost sensor with a single output. This represents a significant cost saving, particularly with low to medium power motors.

The component used in the controller are capable of being integrated onto a single semiconductor chip and such a chip requires no more external components than known digital controllers which have been integrated in this way. The controller can therefore be mass produced in an economical manner. It should be noted that the invention described herein is not restricted to any particular semiconductor technology.

I claim:

1. A motor speed controller which comprises:
   an error amplifier for providing a variable controlled voltage to a motor in response to an input to the amplifier, the input comprising a combination of a demand signal representative of a desired speed of the motor and a feedback signal representative of an actual speed of the motor; and
   an electronic switch having a first input responsive to an electrical signal representative of the actual speed of the motor and a second input responsive to the polarity of the output of the amplifier so as to provide the feedback signal, the value of the feedback signal being dependent on the value of the signal representative of the actual speed of the motor and the polarity of the signal being dependent on the polarity of the output of the amplifier.

2. A motor speed controller according to claim 1, wherein the amplifier comprises an integrating error amplifier.

3. A motor speed controller according to claim 1, wherein the electronic switch comprises a transconductance amplifier.

4. A motor speed controller according to claim 3, wherein the transconductance amplifier is designed to operate substantially in its non-linear region.

5. A motor speed controller according to claim 1, wherein the motor speed controller includes a frequency to current converter for converting a stream of digital pulses output from a sensor attached to the motor into a signal in the form of a current representative of the actual speed of the motor.

6. A motor speed controller according to claim 5, wherein the converter incorporates first and second inputs, the first input being adapted for positive referenced sensors and the second input being adapted for negative referenced sensors.

7. A motor speed controller according to claim 5, wherein the frequency to current converter includes a monostable.

8. A motor speed controller according to claim 7, wherein the monostable is connected between zero volts and a negative voltage.

9. A motor speed controller according to claim 7, wherein the monostable is connected between zero volts and a positive voltage.

10. A motor speed controller according to claim 9, wherein the monostable is provided with a current translation circuit.

11. A motor speed controller according to claim 1 and including means for providing a feedback signal which is dependent upon the current passing through the motor.

* * * * *